(12) United States Patent
Hayashi et al.

(10) Patent No.: US 11,890,638 B2
(45) Date of Patent: Feb. 6, 2024

(54) POWDER SUPPLY DEVICE AND ADDITIVE MANUFACTURING DEVICE

(71) Applicant: IHI CORPORATION, Tokyo (JP)

(72) Inventors: Daiki Hayashi, Tokyo (JP); Tetsuyuki Terauchi, Tokyo (JP); Yuichiro Nakayama, Tokyo (JP); Ken Akiyama, Tokyo (JP); Miki Shinagawa, Tokyo (JP)

(73) Assignee: IHI CORPORATION, Tokyo (JP)

( * ) Notice: Subject to any disclaimer, the term of this patent is extended or adjusted under 35 U.S.C. 154(b) by 442 days.

(21) Appl. No.: 16/652,559

(22) PCT Filed: Oct. 5, 2018

(86) PCT No.: PCT/JP2018/037433
§ 371 (c)(1),
(2) Date: Mar. 31, 2020

(87) PCT Pub. No.: WO2019/070070
PCT Pub. Date: Apr. 11, 2019

(65) Prior Publication Data
US 2020/0238432 A1  Jul. 30, 2020

(30) Foreign Application Priority Data

Oct. 6, 2017 (JP) ................................ 2017-196120

(51) Int. Cl.
*B22F 12/52* (2021.01)
*B05C 19/04* (2006.01)
(Continued)

(52) U.S. Cl.
CPC .............. *B05C 19/04* (2013.01); *B22F 10/28* (2021.01); *B22F 12/52* (2021.01); *B22F 12/55* (2021.01);
(Continued)

(58) Field of Classification Search
CPC .................. B23K 15/086; B28B 1/001; B22F 2003/1057
See application file for complete search history.

(56) References Cited

U.S. PATENT DOCUMENTS

| | | |
|---|---|---|
| 2009/0072450 A1 | 3/2009 | Wallgren et al. |
| 2011/0215117 A1 | 9/2011 | Huang et al. |

(Continued)

FOREIGN PATENT DOCUMENTS

| | | |
|---|---|---|
| CN | 102189065 A | 9/2011 |
| CN | 105437549 A | 3/2016 |

(Continued)

*Primary Examiner* — Nicholas A Wang
(74) *Attorney, Agent, or Firm* — Volpe Koenig

(57) ABSTRACT

A powder supply device includes a hopper accommodating powder, a cylindrical roller provided below the hopper and rotatable around a rotational axis, and a wall surface storing the powder in a space between the roller and the wall surface. The powder supply device moves the powder stored between the roller and the wall surface in a rotation direction of the roller and drops the powder by the roller rotating. A plurality of groove portions extending in an axial direction are formed in a peripheral surface of the roller. At least one of the groove portions is formed such that a capacity allowing the powder to be accommodated changes in the axial direction.

19 Claims, 6 Drawing Sheets

(51) Int. Cl.
  *B33Y 30/00*  (2015.01)
  *B33Y 40/00*  (2020.01)
  *B23K 15/00*  (2006.01)
  *B22F 10/28*  (2021.01)
  *B22F 12/55*  (2021.01)
  *B22F 10/14*  (2021.01)
  *B22F 10/73*  (2021.01)
  *B22F 12/44*  (2021.01)
  *B22F 12/49*  (2021.01)

(52) U.S. Cl.
  CPC ...... *B23K 15/0026* (2013.01); *B23K 15/0086* (2013.01); *B33Y 30/00* (2014.12); *B33Y 40/00* (2014.12); *B22F 10/14* (2021.01); *B22F 10/73* (2021.01); *B22F 12/44* (2021.01); *B22F 12/49* (2021.01)

(56) References Cited

U.S. PATENT DOCUMENTS

| | | |
|---|---|---|
| 2011/0300248 A1 | 12/2011 | Tung et al. |
| 2014/0363585 A1 | 12/2014 | Pialot et al. |
| 2015/0139849 A1 | 5/2015 | Pialot, Jr. et al. |
| 2015/0266236 A1 | 9/2015 | Farah et al. |
| 2015/0328836 A1 | 11/2015 | Okazaki |
| 2016/0129502 A1 | 5/2016 | Varetti |
| 2017/0050270 A1 | 2/2017 | Miyano et al. |

FOREIGN PATENT DOCUMENTS

| | | | |
|---|---|---|---|
| CN | 105855548 A | | 8/2016 |
| CN | 106003709 A | | 10/2016 |
| CN | 106216676 | * | 12/2016 |
| CN | 206083859 U | | 4/2017 |
| CN | 107225245 A | | 10/2017 |
| EP | 3017934 A1 | | 5/2016 |
| JP | H0639299 | * | 10/1994 |
| JP | 2000-024756 A | | 1/2000 |
| JP | 2008-540100 A | | 11/2008 |
| JP | 2010-118544 A | | 5/2010 |
| JP | WO2015146885 | * | 3/2015 |
| JP | 6717900 B1 | | 5/2015 |
| JP | 2015-527942 A | | 9/2015 |
| JP | 2015-178245 A | | 10/2015 |
| JP | WO2015146885 | * | 10/2015 |
| JP | 2016-108662 A | | 6/2016 |
| WO | 2015/146885 A1 | | 10/2015 |
| WO | 2016/151783 A1 | | 9/2016 |

* cited by examiner

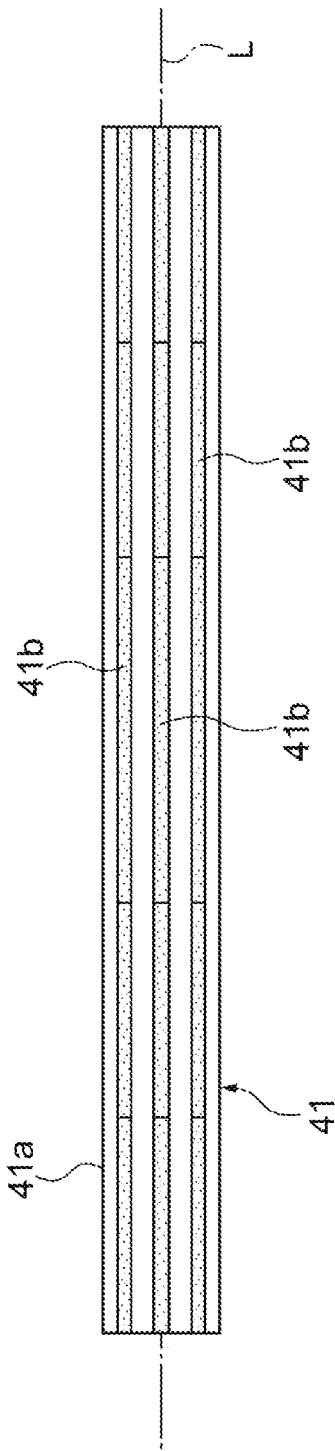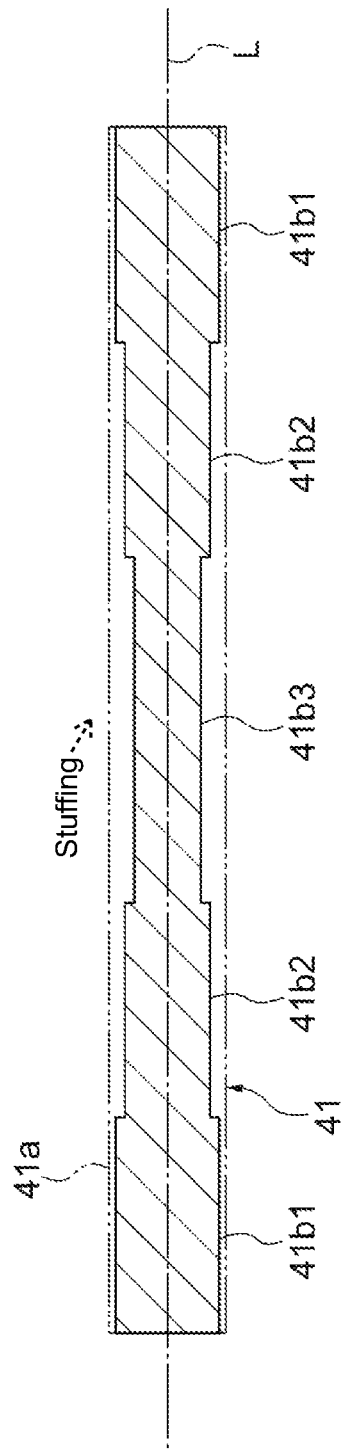

FIG. 6

Provide the powder supply
device of FIGs. 2-4B

60

↓

Fit stuffer material in a groove
of one of the rollers to change
the capacity of the groove

62

POWDER SUPPLY DEVICE AND ADDITIVE MANUFACTURING DEVICE

CROSS REFERENCE TO RELATED APPLICATION

This application is a national stage entry of International Patent Application No. PCT/JP2018/038874 filed on Oct. 18, 2018 and claims the benefit of priority of Japanese Patent Application No. 2017-202401 filed Oct. 19, 2017, the contents of which are all incorporated herein by reference in their entirety.

TECHNICAL FIELD

The present disclosure relates to a powder supply device and an additive manufacturing device.

BACKGROUND ART

Devices described in Patent Documents 1 to 4 are known as techniques in such a field. The device described in Patent Document 1 is a system supplying and distributing powder to a work region. The powder is piled up with an angle of repose in the lower portion of a powder storage unit. A rake having a triangular cross section is inserted into the heaped powder. The powder is applied to the work region (modeling region) by the rake reciprocating. In addition, in the devices described in Patent Documents 2 to 4, powder is supplied by a rotating body (roller) rotating. The rotating body is provided with one or more grooves.

CITATION LIST

Patent Literature

Patent Document 1: Japanese Unexamined Patent Publication No. 2008-540100
Patent Document 2: Japanese Unexamined Patent Publication No. 2015-527942
Patent Document 3: International Publication No. 2016/151783
Patent Document 4: Japanese Unexamined Patent Publication No. 2000-24756

SUMMARY OF INVENTION

In the related art using the above-described rotating body (roller), the powder accumulated in the groove drops by the rotating body rotating. However, the amount by which the powder drops (is supplied) in an axial direction is constant and the powder supply amount cannot be adjusted. The powder supplied from the powder supply device is leveled after being moved onto a modeling surface by, for example, the rake (application mechanism or recoater). Depending on the shape of the modeling surface, the length (that is, the width) of the roller in a direction orthogonal to the axial direction may not be constant. When the powder supply amount in the axial direction is constant in this case, surplus powder that protrudes from the modeling surface and does not contribute to modeling may be generated. Such surplus powder may cause a decline in efficiency in terms of powder recyclability or the like.

The present disclosure describes a powder supply device and an additive manufacturing device capable of giving a distribution in a powder supply amount in the axial direction of a roller.

A powder supply device according to one aspect of the present disclosure includes a hopper accommodating powder, a cylindrical roller provided below the hopper and rotatable around a rotational axis, and a wall surface facing a peripheral surface of the roller and storing the powder in a space between the roller and the wall surface. The powder stored between the roller and the wall surface is moved in a rotation direction of the roller and dropped by the roller rotating. A plurality of groove portions extending in an axial direction are formed in the peripheral surface of the roller. At least one of the plurality of groove portions is formed such that a capacity allowing the powder to be accommodated changes in the axial direction.

According to some embodiments of the present disclosure, a distribution can be given in a powder supply amount in an axial direction. As a result, powder can be supplied by an appropriate supply amount in accordance with the shape of a modeling surface and surplus powder generation can be suppressed.

BRIEF DESCRIPTION OF DRAWINGS

FIG. 4A is a front view of a roller and FIG. 4B is an end view in which the roller is cut along a rotational axis.
FIG. 6 is a flow chart of changing the accuracy of the powder supply.

DESCRIPTION OF EMBODIMENTS

Figure 1:
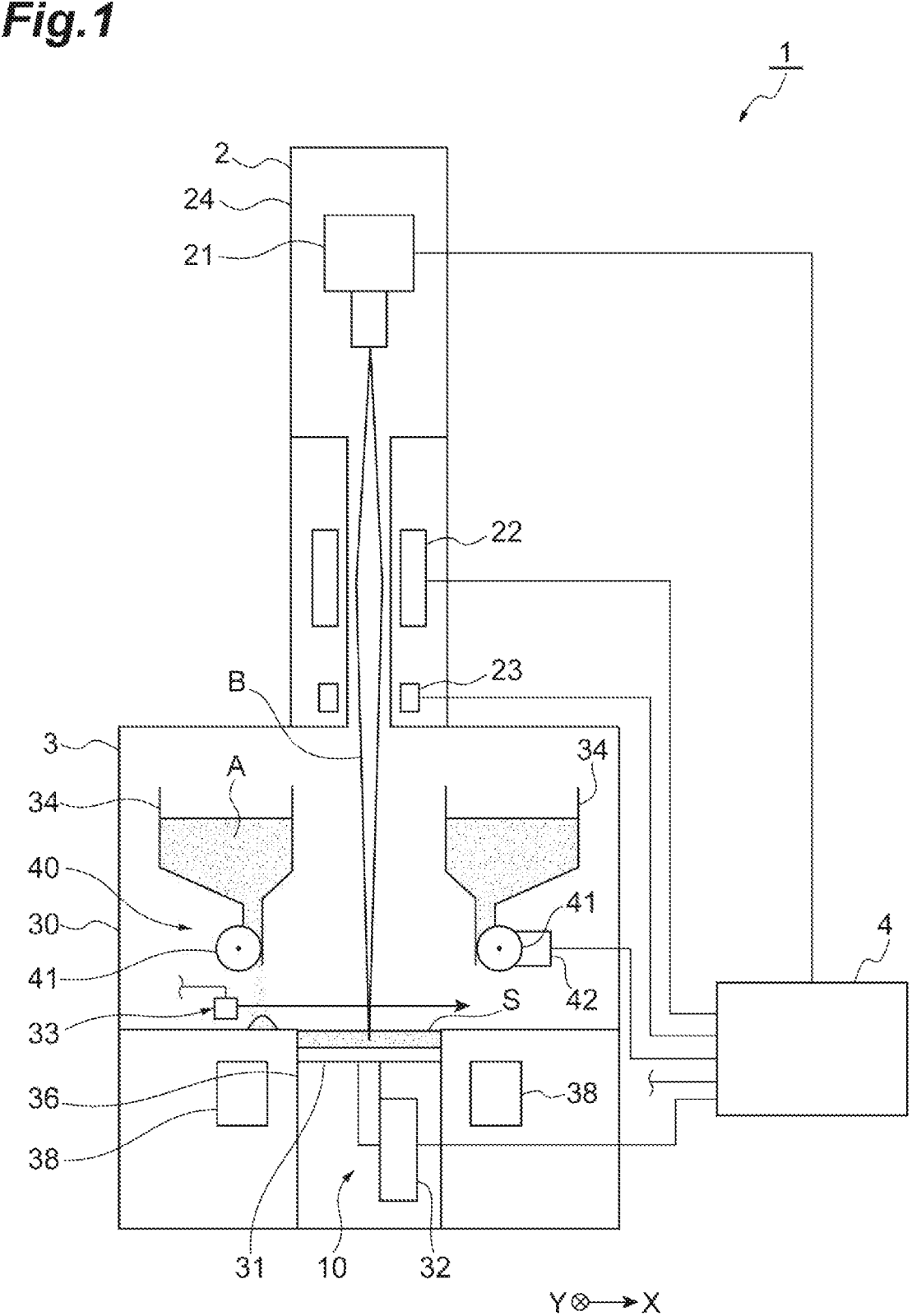
FIG. 1 is a diagram illustrating a schematic configuration of a powder supply device and an additive manufacturing device according to an embodiment of the present disclosure.

A powder supply device according to one aspect of the present disclosure includes a hopper accommodating powder, a cylindrical roller provided below the hopper and rotatable around a rotational axis, and a wall surface facing a peripheral surface of the roller and storing the powder in a space between the roller and the wall surface. The powder stored between the roller and the wall surface is moved in a rotation direction of the roller and dropped by the roller rotating. A plurality of groove portions extending in an axial direction are formed in the peripheral surface of the roller. At least one of the plurality of groove portions is formed such that a capacity allowing the powder to be accommodated changes in the axial direction.

According to this powder supply device, the powder stored in the space between the roller and the wall surface drops by the roller rotating. The capacity of the groove portion formed in the peripheral surface of the roller is not constant but changes in the axial direction. As a result, the amount of the powder that drops, that is, a supply amount can be changed in the axial direction. Accordingly, a distribution can be given in the supply amount of the powder in the axial direction. As a result, the powder can be supplied by an appropriate supply amount in accordance with the shape of a modeling surface and surplus powder generation can be suppressed in a case where, for example, the shape of the modeling surface is not a simple rectangular shape.

In some embodiments, the capacity in a middle portion in the axial direction is larger than the capacity in an end portion in the axial direction in the at least one groove portion. In a case where the shape of the modeling surface is a circular shape or the like, it is desirable that more powder is supplied in the middle portion than in the axial end portion. According to this aspect, the powder can be supplied by an appropriate supply amount in accordance with the shape of the modeling surface.

In some embodiments, the capacity increases from the end portion in the axial direction toward the middle portion in the at least one groove portion. In this case, the powder can be supplied by an appropriate supply amount to the circular modeling surface in particular.

In some embodiments, a bottom surface of the at least one groove portion is formed so as to change in stages. In this case, the roller is machined and manufactured with ease.

In some embodiments, the powder supply device further includes a drop port for dropping the powder, the drop port being formed beside the rotational axis of the roller.

An additive manufacturing device according to one aspect of the present disclosure includes the powder supply device according to any of the above, a work table provided below the roller and having an upper surface where the powder is placed, a modeling surface exposed upward beside the work table, an application mechanism movable onto the modeling surface from the upper surface of the work table, and a beam emission unit emitting a beam toward powder supplied onto the modeling surface by the application mechanism. According to this additive manufacturing device, a distribution can be given in the supply amount of the powder dropped toward the upper surface of the work table. As a result, the powder can be supplied by an appropriate supply amount in accordance with the shape of the modeling surface and surplus powder generation can be suppressed. As a result, effects such as improvement of the recyclability of the powder, suppression of a deterioration in the quality of the powder, and device size reduction are exhibited during additive manufacturing.

Hereinafter, an embodiment of the present disclosure will be described with reference to the drawings. It should be noted that the same elements will be denoted by the same reference symbols without redundant description in the description of the drawings.

FIG. 1 is a schematic configuration diagram of an additive manufacturing device according to the embodiment of the present disclosure. An additive manufacturing device 1 is a device that models a three-dimensional object by melting and solidifying powder A on a modeling surface S by irradiating the powder A with an electron beam B. The additive manufacturing device 1 includes an electron beam emission unit 2, a modeling unit 3, and a control unit 4.

The electron beam emission unit 2 melts the powder A by emitting the electron beam B toward the powder A on the modeling surface S of the modeling unit 3. The electron beam emission unit 2 may preheat the powder A by irradiating the powder A with the electron beam B before the modeling of the object is performed.

The electron beam emission unit 2 includes an electron gun unit 21, a convergence coil 22, and a deflection coil 23. The electron gun unit 21 is electrically connected to the control unit 4, operates in response to a control signal from the control unit 4, and emits the electron beam B. The electron gun unit 21 is provided so as to, for example, emit the electron beam B downward. The convergence coil 22 is electrically connected to the control unit 4 and operates in response to a control signal from the control unit 4. The convergence coil 22 is installed around the electron beam B emitted from the electron gun unit 21 and converges the electron beam B. The deflection coil 23 is electrically connected to the control unit 4 and operates in response to a control signal from the control unit 4. The deflection coil 23 is installed around the electron beam B emitted from the electron gun unit 21 and adjusts the irradiation position of the electron beam B in accordance with a control signal. The electron gun unit 21, the convergence coil 22, and the deflection coil 23 are installed in, for example, a tubular column 24.

The modeling unit 3 is a part where a modeling object C, which is a desired object, is modeled. The modeling unit 3 includes a work table 39 (see FIG. 2), a modeling tank 36, a plate 31, a lifting and lowering device 10, two powder supply devices 40, and an application mechanism 33 in a chamber 30. The inside of the chamber 30 is kept in a vacuum state.

Figure 2:
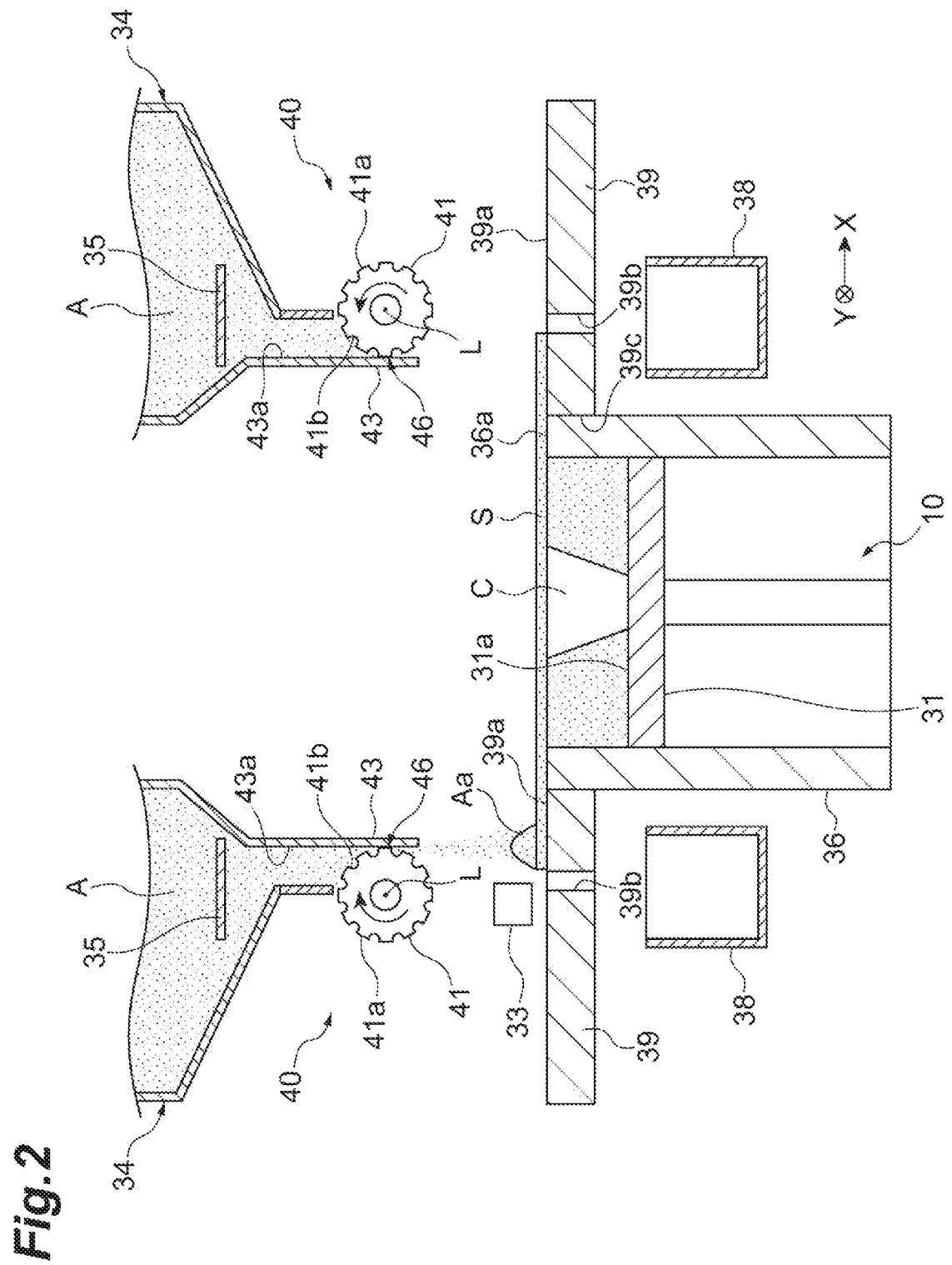
FIG. 2 is a diagram illustrating a modeling tank, a plate, and the powder supply device in FIG. 1.

As illustrated in FIGS. 1 and 2, the work table 39 is disposed below the powder supply device 40 and has a horizontal and flat upper surface 39a on which the powder A supplied by the powder supply device 40 is placed. The work table 39 is provided with an opening 39c having a circular shape or the like. The modeling tank 36, which has a cylindrical shape or the like, is fitted in this opening 39c. The modeling tank 36 has an axis extending in a vertical direction. An upper end surface 36a of the modeling tank 36 is, for example, flush with the upper surface 39a of the work table 39.

The plate 31 is a flat plate-shaped member disposed in the modeling tank 36. The plate 31 has, for example, a circular shape. The shape of the plate 31 corresponds to the shape of the modeling surface S (that is, a modeling region). The plate 31 has a flat upper surface 31a and supports the object to be modeled on the upper surface 31a. The plate 31 is disposed on an extension line in the emission direction of the electron beam B and is provided in parallel to, for example, a horizontal XY plane. The plate 31 is disposed in the modeling tank 36. The plate 31 and the modeling tank 36 are disposed concentrically.

The lifting and lowering device 10 supports the plate 31 and lifts and lowers the plate 31 in an up-down direction in the modeling tank 36. The lifting and lowering device 10 has a lifting and lowering machine 32 lifting and lowering the plate 31. The lifting and lowering device 10 may have a lifting and lowering stage (not illustrated) installed below the plate 31 and supporting the plate 31. The lifting and lowering machine 32 is electrically connected to the control unit 4 and operates in response to a control signal from the control unit 4. The lifting and lowering machine 32 moves the plate 31 upward in the early stage of the object modeling and lowers the plate 31 each time the powder A is melted, solidified, and laminated on the plate 31. The modeling object C is modeled on the plate 31. The modeling surface S is formed on the upper surface of the modeling object C. This modeling surface S has the same outer shape as the plate 31. The melting modeling surface that results from the melting and solidification of the powder A descends as the plate 31 descends. A new modeling surface S (next layer) is formed on the lowered melting modeling surface. In the work table 39, the plate 31, and the lifting and lowering device 10 configured as described above, the modeling surface S is exposed at the position of the opening 39c on the side of the work table 39.

The shapes of the plate 31, the modeling tank 36, and the modeling surface S described above can be appropriately changed in accordance with the shape of the modeling object C or the like. Other shapes may be adopted although a case where the plate 31 and the modeling surface S are circular and the modeling tank 36 is cylindrical is described in the present embodiment. The plate 31 is disposed in the modeling tank 36 and the modeling surface S is formed on the plate 31, and thus the plate 31 and the modeling surface S have the same shape and size in plan view.

The two powder supply devices 40 are symmetrically installed with respect to the middle part of the work table 39 where the plate 31, the modeling tank 36, and the modeling surface S are provided. Each powder supply device 40 includes a hopper (or tank) 34 accommodating the powder A. A cylindrical roller 41 for dropping the powder A by a predetermined supply amount is provided below the hopper 34. A discharge port for discharging the powder A is formed in the lower portion of the hopper 34 and the powder A is supplied to the roller 41 from this discharge port. This discharge port is formed so as to cover substantially the entire roller 41 and the powder A is supplied from the hopper 34 to the entire roller 41 in a length direction (axial direction).

The roller 41 has a rotational axis L extending in the horizontal Y direction and is rotatable around the rotational axis L. The roller 41 is supported by a side wall (not illustrated). The length of the roller 41 is larger than the Y-direction length of the modeling surface S (that is, the plate 31). The length of the roller 41 may be substantially equal to the Y-direction length of the modeling surface S (that is, the plate 31). Although the roller 41 is made of, for example, stainless steel, the roller 41 may be made of another material. The roller 41 is provided with a drive motor 42. The drive motor 42 is electrically connected to the control unit 4 and operates in response to a control signal from the control unit 4. The drive motor 42 rotates by a predetermined rotation angle (or number of rotations) by the drive motor 42 being controlled by the control unit 4. The powder A is dropped by a predetermined supply amount in accordance with the rotation angle (or number of rotations) of the roller 41. The dropped powder A is placed and deposited on the upper surface 39a of the work table 39 provided below the roller 41 and becomes deposited powder Aa. The deposited powder Aa is formed in a range including the modeling surface S (range larger than the modeling surface S) in the Y direction (see FIG. 3). The mechanism for supplying the powder A from the roller 41 will be described in detail later.

Multiple powder bodies constitute the powder A. Metallic powder or the like is used as the powder A. In addition, granules larger in particle size than the powder may be used as the powder A insofar as the granules can be melted and solidified by being irradiated with the electron beam B.

The application mechanism 33 is a member moving the deposited powder Aa onto the modeling surface S, supplying the powder A onto the modeling surface S, and leveling the powder A. The application mechanism 33 is a member extending with length in the horizontal Y direction. The length of the application mechanism 33 is larger than the Y-direction length of the modeling surface S (that is, the plate 31). The application mechanism 33 is provided so as to cover the entire modeling surface S in the Y direction when positioned on the modeling surface S (see FIG. 3). The application mechanism 33 is provided at a position separated with a gap from the upper surface 39a of the work table 39. The cross-sectional shape of the application mechanism 33 may be rectangular as illustrated in the drawing or may be another shape.

The application mechanism 33 is movable in the horizontal X direction from the upper surface 39a of the work table 39 onto the modeling surface S. More specifically, the application mechanism 33 is configured to reciprocate along the X direction so as to cross over the modeling surface S. While moving on the upper surface 39a and the modeling surface S, the application mechanism 33 maintains a predetermined distance from the upper surface 39a and the modeling surface S. The application mechanism 33 is moved by an actuator (not illustrated) or the like. The application mechanism 33 operates in response to a control signal from the control unit 4.

The control unit 4 is an electronic control unit controlling the entire additive manufacturing device 1. The control unit 4 is configured to include a computer and hardware such as a central processing unit (CPU), a read only memory (ROM), and a random access memory (RAM) and software such as a program stored in the ROM constitute the computer. The control unit 4 executes lifting and lowering control on the plate 31, operation control on the application mechanism 33, emission control on the electron beam B, operation control on the deflection coil 23, and so on. The control unit 4 outputs a control signal to the lifting and lowering machine 32, operates the lifting and lowering machine 32, and adjusts the position of the plate 31 in the up-down direction as the lifting and lowering control on the plate 31. The control unit 4 operates the application mechanism 33 before the emission of the electron beam B and levels the powder A on the plate 31 as the operation control on the application mechanism 33. The control unit 4 outputs a control signal to the electron gun unit 21 and causes the electron gun unit 21 to emit the electron beam B as the emission control on the electron beam B.

The control unit 4 outputs a control signal to the deflection coil 23 and controls the irradiation position of the electron beam B as the operation control on the deflection coil 23. For example, three-dimensional computer-aided design (CAD) data on the modeling object C, which is an object to be modeled, is input to the control unit 4. The control unit 4 generates two-dimensional slice data on the basis of this three-dimensional CAD data. The slice data is, for example, data on a horizontal cross section of the modeling object C and an aggregate of multiple data corresponding to an up-down position. The region where the powder A on the modeling surface S is irradiated with the electron beam B is determined on the basis of this slice data and a control signal is output to the deflection coil 23 in accordance with that region.

Figure 3:
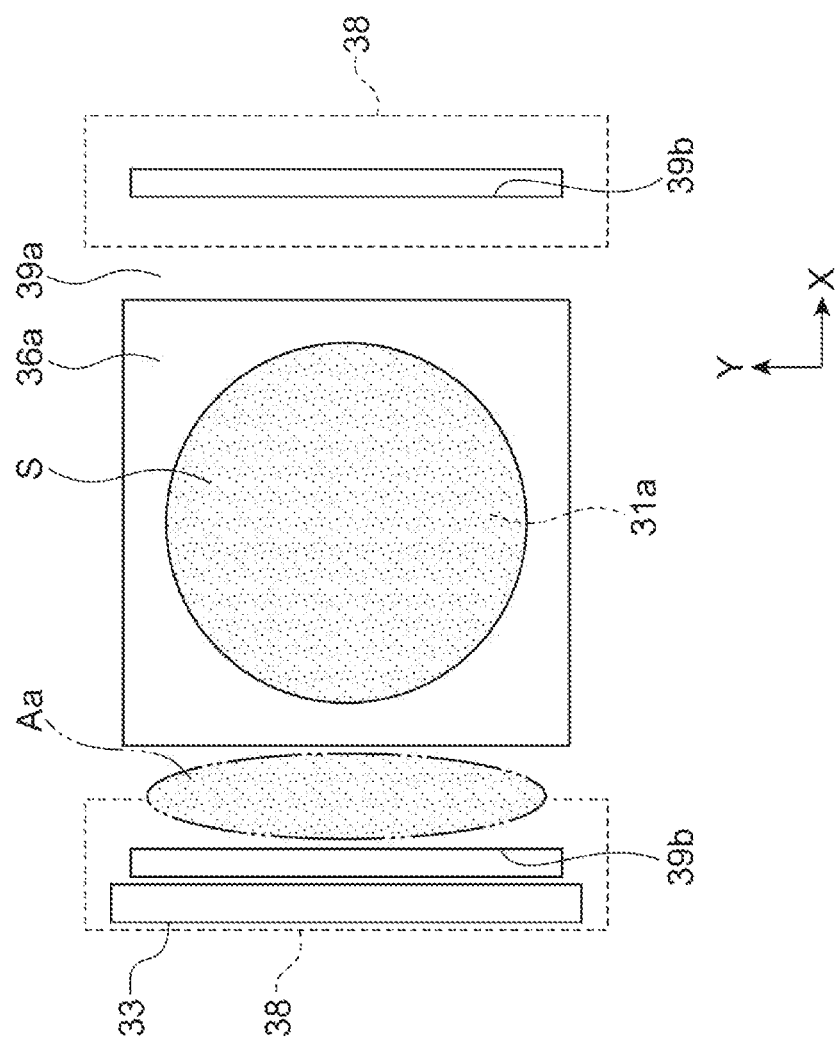
FIG. 3, which is a plan view illustrating a modeling surface and the periphery of the modeling surface, is a diagram conceptually illustrating the state of a supplied powder material.

Subsequently, the configuration that is related to the movement of the powder supply device 40 and the powder A will be described in detail. The additive manufacturing device 1 of the present embodiment includes a mechanism collecting the powder A that is not used for modeling. As illustrated in FIGS. 1 to 3, a hole portion 39b penetrating the upper surface 39a and the back surface side of the work table 39 is formed in the work table 39 provided in the chamber 30. Two hole portions 39b are formed on both sides of the modeling surface S in the X direction. These hole portions 39b are powder collection holes for dropping and collecting the powder A remaining after being moved by the application mechanism 33 and supplied onto the modeling surface S or the surplus powder A protruding from the modeling surface S. As illustrated in FIG. 3, each hole portion 39b has a rectangular shape that is long in the Y direction. The length of the hole portion 39b is larger than the Y-direction length of the modeling surface S (that is, the plate 31). The hole portion 39b is formed in a range including the modeling surface S (range larger than the modeling surface S) in the Y direction.

As illustrated in FIG. 2, each hole portion 39b is provided between the modeling tank 36 and the stop position of the application mechanism 33. The powder A is deposited with a predetermined thickness in the rectangular region between the two hole portions 39b (region including the modeling surface S). After the application mechanism 33 passes through the modeling surface S, each hole portion 39b passes and drops the surplus powder A further moved by the application mechanism 33. As illustrated in FIGS. 2 and 3, collection tanks 38 are provided below the respective hole portions 39b. The upper surface of the collection tank 38 is open upward, that is, toward the hole portion 39b. The surplus powder A dropped through the hole portion 39b is accommodated into the collection tank 38.

The powder supply device 40 will be described in detail. As illustrated in FIG. 2, the powder supply device 40 includes a front wall portion 43 connected to the discharge port in the lower portion of the hopper 34. The front wall portion 43 is a flat plate extending in the Y direction and the vertical direction and the front wall portion 43 is positioned between the modeling tank 36 and the hole portion 39b in the X direction. In the X direction, the above-described roller 41 is installed on the side of the front wall portion 43 that is opposite to the modeling tank 36. The roller 41 is rotatably installed in a state where a peripheral surface 41a of the roller 41 abuts against a wall surface 43a of the front wall portion 43 or has a very small gap from the wall surface 43a. In other words, the wall surface 43a of the front wall portion 43 faces the peripheral surface 41a of the roller 41.

It should be noted that a partition plate 35 extending in the horizontal direction may be installed in the hopper 34. The partition plate 35 partitions the internal space in the lower portion of the hopper 34 in the up-down direction. The partition plate 35 is a plate for preventing the weight of the powder A in the hopper 34 from being applied to a supply unit such as the roller 41. The partition plate 35 is installed directly above the opening portion at the lower end of the hopper 34 and on the downflow path of the powder.

The wall surface 43a of the front wall portion 43 stores the powder A supplied from the hopper 34 in the space between the wall surface 43a and the roller 41. The powder A is stored in the space without dropping in a state where the peripheral surface 41a of the roller 41 that is stationary faces the wall surface 43a of the front wall portion 43. In other words, even in a case where there is a very small gap between the peripheral surface 41a of the roller 41 and the wall surface 43a of the front wall portion 43, the gap is capable of blocking the powder A from passing. Assuming an imaginary vertical plane passing between the roller 41 and the wall surface 43a of the front wall portion 43, the vertical plane is the upper surface 39a of the work table 39 and passes between the modeling tank 36 and the hole portion 39b. Because of this positional relationship, the deposited powder Aa, which is the powder A dropped and supplied from the powder supply device 40 and placed and deposited on the upper surface 39a, is positioned between the modeling tank 36 and the hole portion 39b.

As illustrated in FIGS. 2 and 4A, a plurality of groove portions 41b extending in the axial direction are formed in the peripheral surface 41a of the roller 41. The plurality of groove portions 41b are provided at equal intervals in a circumferential direction. Each groove portion 41b is recessed radially inward from the peripheral surface 41a, which is a cylindrical surface. The groove portions 41b have, for example, the same shape and size. The cross-sectional shape of each groove portion 41b may be a rectangular shape, a V shape, or a rounded shape. The powder A stored in the spaces between the above-described front wall portion 43 and the groove portions 41b can be accommodated in the groove portions 41b. In other words, each groove portion 41b can be filled with the powder A. The number of the groove portions 41b can be appropriately set in accordance with the amount by which the powder A is supplied, the resolution of the supply amount, or the like. It should be noted that the groove portion 41b of the roller 41 is not illustrated in FIG. 1.

The roller 41 having the above configuration accommodates the powder A stored in the space between the roller 41 and the front wall portion 43 in the groove portion 41b and rotates in the direction in which the groove portion 41b moves downward from above with respect to the front wall portion 43. As a result of this rotation, the roller 41 moves the powder A in the groove portion 41b in the direction of the rotation, and the roller 41 drops the powder A when the groove portion 41b is separated from the wall surface 43a of the front wall portion 43. A drop port 46 for dropping the powder A in the powder supply device 40 is formed slightly below the part where the roller 41 is closest to the front wall portion 43. By the plurality of groove portions 41b, which have a predetermined cross-sectional area, being provided in the peripheral surface 41a of the roller 41 as described above, the supply amount of the powder A can be set with a fine resolution. As a result, the supply amount can be finely adjusted. In addition, powder supply with high reproducibility is possible. In a case where it is determined on the basis of means such as a sensor and image processing that the supply amount of the powder A is insufficient, the powder supply device 40 is capable of replenishing the powder A by a minimum amount. As a result, the amount of the surplus powder A can be minimized.

As described above, in the powder supply device 40, the drop port 46 for dropping the powder A is formed at the same height as the rotational axis L or slightly below the rotational axis L. In other words, the drop port 46 is formed beside the rotational axis L of the roller 41 (at the front where the powder A is supplied). The drop port 46 is formed at the same height as the rotational axis L or at a position lower than the rotational axis L and higher than the lower end of the roller 41. The drop port 46 formed beside the rotational axis L allows the powder supply device 40 to supply the powder A to a location close to the modeling surface S. As a result, the surplus powder on the work table 39 can be minimized. This has the effect of recyclability improvement and powder quality deterioration suppression as described later. It should be noted that beside the rotational axis L means a position laterally deviating (deviating to the front where the powder A is supplied) from a vertical plane including the rotational axis L. In a case where the height direction that is perpendicular to the X direction and the Y direction is a Z direction, the vertical plane is a plane that is parallel to the YZ plane and includes the rotational axis L.

In the present embodiment, the capacity of each groove portion 41b that allows the powder A to be accommodated (hereinafter, also referred to as the accommodation capacity) changes in the axial direction. As illustrated in FIG. 4B, each groove portion 41b includes two first step portions 41b1 formed in both axial end portions and two second step portions 41b2 formed so as to communicate with the middle sides of the first step portions 41b1 in the axial direction. The second step portion 41b2 is deeper than the first step portion 41b1. Each groove portion 41b further includes one third step portion 41b3 formed between the two second step portions 41b2 and in the middle portion in the axial direction. The third step portion 41b3 is even deeper than the second step portion 41b2. It should be noted that the groove portion 41b has a constant width in the axial direction. Here, "width" is the distance between a pair of straight lines formed by the groove portion 41b intersecting with the peripheral surface 41a, which is a cylindrical surface. Accordingly, the width of the first step portion 41b1, the width of the second step portion 41b2, and the width of the third step portion 41b3 are equal to one another.

The first step portion 41b1, the second step portion 41b2, and the third step portion 41b3 have the same width, have different depths, and thus have different accommodation capacities. In this manner, in each groove portion 41b of the roller 41, the accommodation capacity in the middle portion in the axial direction (third step portion 41b3) is larger than the accommodation capacity in the end portion in the axial direction (first step portion 41b1). In other words, in each groove portion 41b of the roller 41, the accommodation capacity increases from the axial end portion toward the middle portion. The bottom surface of each groove portion 41b is formed so as to change in stages as described above.

According to the powder supply device 40 of the present embodiment described above, the powder A stored in the space between the roller 41 and the wall surface 43a drops by the roller 41 rotating. The capacity of the groove portion 41b formed in the peripheral surface 41a of the roller 41 is not constant but changes in the axial direction. As a result, the amount of the powder A that drops, that is, the supply amount can be changed in the axial direction. Accordingly, a distribution can be given in the supply amount of the powder A in the axial direction. As a result, the powder A can be supplied by an appropriate supply amount in accordance with the shape of the modeling surface S and surplus powder generation can be suppressed in a case where, for example, the shape of the modeling surface S is not a simple rectangular shape. In other words, in the powder supply device 40, the capacity of the groove and the amount of dropping of the powder corresponding to the region are adjusted in accordance with the dimension of the modeling surface in the X direction (application direction). For example, the amount of dropping of the powder corresponding to the region increases as the dimension of the modeling surface in the X direction (application direction) increases.

In addition, the following various effects are obtained. Firstly, the recyclability of the powder A, that is, the recycling efficiency is improved. The recycling efficiency of the powder A is, for example, a value obtained by dividing "powder used for modeling" by "powder required for preparation". "Powder required for preparation" is the sum of "powder used for modeling" and "assumed surplus powder amount", and thus a decrease in surplus powder results in a decrease in "powder required for preparation" and powder recycling efficiency improvement. Secondly, a deterioration of the quality of the powder A is suppressed. During the application operation of the powder A, the powder A passes over the modeling surface S, and thus the surplus powder is instantaneously heated. Accordingly, the surplus powder is more likely to entail a deterioration in quality than the powder in the hopper 34. As a result, decreasing the surplus powder as in the present embodiment is effective in terms of powder quality deterioration suppression. Thirdly, the device can be reduced in size. By reducing the surplus powder, it is possible to reduce both the supply amount of the powder A and the collection amount of the powder A. As a result, the hopper 34 or the collection tank 38 can be reduced in size.

In the groove portion 41b, the capacity in the middle portion in the axial direction is larger than the capacity in the axial end portion. In a case where the shape of the modeling surface S is a circular shape or the like, it is desirable that more powder A is supplied in the middle portion than in the axial end portion. According to this aspect, the powder can be supplied by an appropriate supply amount in accordance with the shape of the modeling surface (see the deposited powder Aa illustrated in FIG. 3). It should be noted that a case where the modeling surface S is circular is non-limitative and this aspect is advantageous insofar as the length, that is, the width in the movement direction of the application mechanism (X direction) becomes smaller toward the axial end portion in the shape.

The capacity in the groove portion 41b increases from the axial end portion toward the middle portion, and thus the powder can be supplied by an appropriate supply amount to the circular modeling surface S in particular (see FIG. 3).

The bottom surface of the groove portion 41b is formed so as to change in stages, and thus the roller 41 is machined and manufactured with ease.

According to the additive manufacturing device 1 of the present embodiment, the distribution can be given in the supply amount of the powder A dropped toward the upper surface 39a of the work table 39. As a result, the powder can be supplied by an appropriate supply amount in accordance with the shape of the modeling surface S and surplus powder generation can be suppressed. As a result, effects such as improvement of the recyclability of the powder A, suppression of a deterioration in the quality of the powder A, and device size reduction are exhibited as described above during additive manufacturing.

Figure 5:
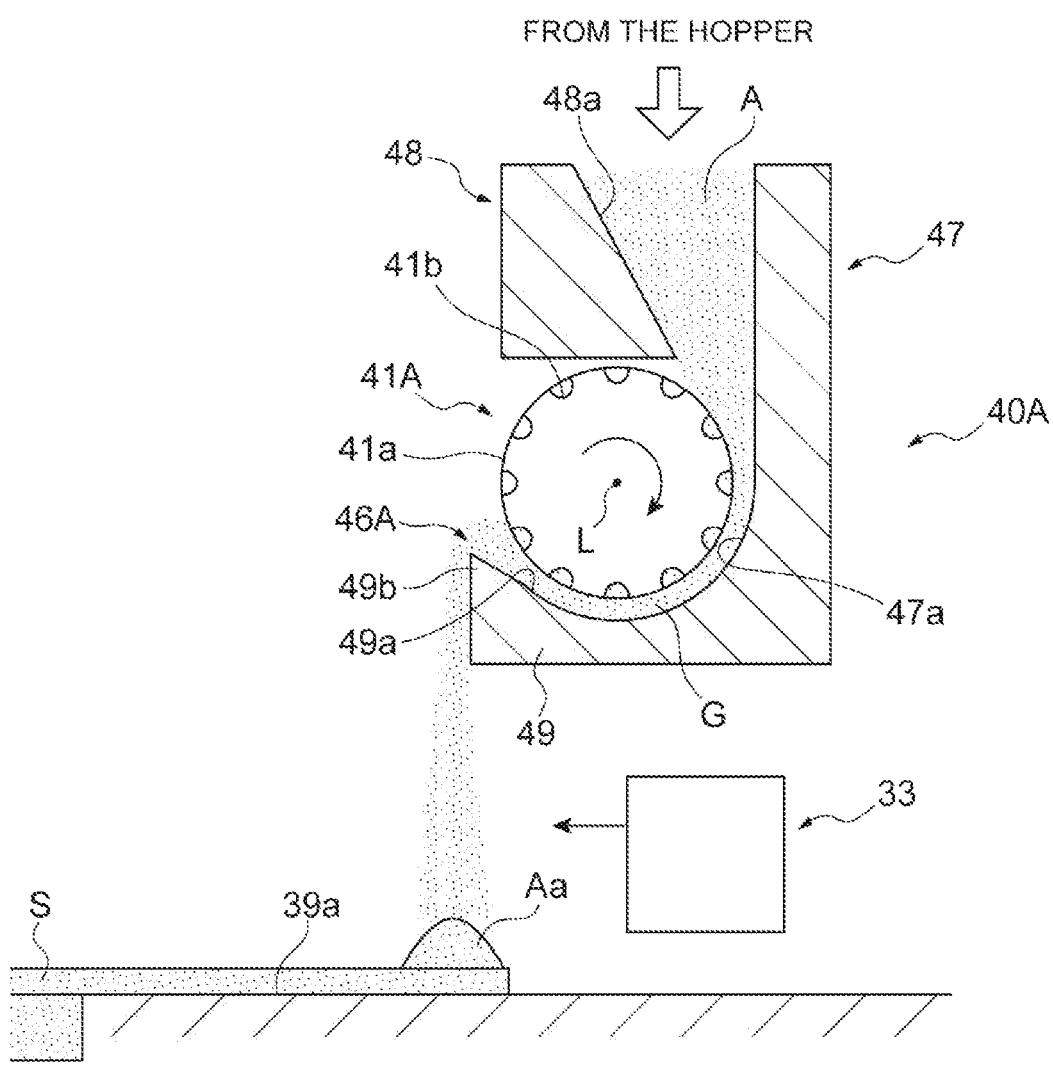
FIG. 5 is a diagram illustrating a powder supply device according to another embodiment of the present disclosure.

A powder supply device 40A according to another embodiment will be described with reference to FIG. 5. The powder supply device 40A illustrated in FIG. 5 is different from the powder supply device 40 illustrated in FIG. 2 in that a roller 41A faces a side wall portion 47 and a bottom wall portion 49 connected to the lower end of the side wall portion 47 instead of the front wall portion 43 having the wall surface 43a and there is a gap G between these wall portions and the roller 41A. A structure for upward scraping from a wall surface 49a (slope) of the bottom wall portion 49, which is an upwardly inclined surface, is adopted in the powder supply device 40A whereas the powder supply device 40 is a closed structure using the front wall portion 43. It should be noted that the roller 41A is identical to and unchanged from the roller 41 of the above-described embodiment. It should be noted that the hole portion 39b and the modeling tank 36 are not illustrated in FIG. 5.

The roller 41A faces a wall surface 47a of the side wall portion 47 and the wall surface 49a of the bottom wall portion 49 with the predetermined gap G. The roller 41A accommodates the powder A stored in the space between the roller 41A and the side wall portion 47 in the groove portion 41b, guides the powder A into the gap G at the same time, and rotates in the direction in which the groove portion 41b moves from the wall surface 47a to the wall surface 49a. The roller 41A moves the powder A in the groove portion 41b and the powder A in the gap G in the rotation direction as a result of the rotation, and the powder A is dropped from a tip portion 49b when the groove portion 41b is separated from the tip portion 49b of the bottom wall portion 49. A drop port 46A for dropping the powder A in the powder supply device 40A is formed slightly above the tip portion 49b of the bottom wall portion 49. It should be noted that a guide block 48 is provided above the roller 41A and the guide block 48 includes a slope 48a for guiding the powder A toward the wall surface 47a.

In the powder supply device 40A, the drop port 46A for dropping the powder A is formed slightly below the rotational axis L. In other words, the drop port 46A is formed beside the rotational axis L of the roller 41A. The drop port 46A is formed at, for example, a position lower than the rotational axis L and higher than the lower end of the roller 41A. The drop port 46A formed beside the rotational axis L allows the powder supply device 40A to supply the powder A to a location close to the modeling surface S. As a result, the surplus powder on the work table 39 can be minimized.

The powder supply device 40A and the powder supply device 40 are similar to each other in terms of actions and effects. The powder supply device 40A is advantageous in that the powder supply device 40A is a wear part-less supply mechanism.

The present invention is not limited to the embodiments of the present disclosure that have been described above. For example, the shape of the modeling tank 36 is not limited to a cylindrical shape and the shape of the modeling tank 36 may be a square tube shape having a rectangular cross section or a polygonal cross section. The shape of the plate 31 is not limited to a circular shape and the plate 31 may be rectangular or polygonal. The configuration of the application mechanism 33 (or recoater) is not limited to the configuration described above. For example, the application mechanism 33 may have a plate shape or may be configured to include a roller unit, a rod-shaped member, a brush unit, or the like.

The change in capacity in the groove portion 41b is not limited to the above-described configuration and the capacity may be changed in another manner. In a case where the modeling surface S has a special shape, the groove portion 41b may be configured such that the capacity in the middle portion in the axial direction is smaller than the capacity in the axial end portion.

A change in axial capacity may be provided for only some of the plurality of groove portions 41b. For example, a change in axial capacity may be provided for only one of the two groove portions 41b that are adjacent to each other. A change in axial capacity may be provided for only one of the plurality of groove portions 41b.

How to change the capacity in the groove portion 41b is not limited to the configuration in which the bottom surface is changed in stages and how to change the capacity in the groove portion 41b may be a configuration in which the bottom surface is gently (continuously) inclined.

The additive manufacturing device may include change means by which the axial capacity can be changed. For example, a spacer or a similar member (stuffing) may be fitted in a groove, such as generally indicated in FIG. 4B, and the stuffing may be fixed at any axial position in another configuration. Alternatively, the position of stuffing may be changeable with respect to one roller.

In addition, a configuration in which a spacer (stuffing) is fitted over the entire axial region of a groove allows the capacity of the groove to be changed. As a result, the amount of powder supply per rotation changes. As a result, the accuracy of the supply can be changed. For example, an example flowchart of this method of changing the accuracy of the powder supply is provided in FIG. 6 where the powder supply device of FIGS. 2-4B is provided in step 60 and the stuffer material is fitted in a groove of one of the rollers to change the powder capacity of the groove in step 62 to thereby adjust the accuracy of the powder supply. Further, more accurate powder supply becomes possible by, for example, the capacity of the groove being reduced. The powder can be supplied at a higher speed by the capacity of the groove being increased.

The additive manufacturing device is not limited to a modeling device to which an electron beam melting method is applied and the additive manufacturing device may be, for example, a modeling device to which a laser melting method is applied. In other words, the beam that is emitted to the powder A in the additive manufacturing device may be a laser beam. The beam that is emitted to the powder A in the additive manufacturing device may be a charged particle beam, which is a concept including an electron beam and an ion beam. The additive manufacturing device is applicable to any type of modeling device that supplies the powder A by dropping the powder A.

In addition, modeling devices to which the present invention can be applied are not limited to powder bed fusion bonding-type modeling devices. The present invention is also applicable to, for example, a binding agent injection-type modeling device that selectively binds powder by injecting a binder (binding agent) onto a powder bed. From another viewpoint, the present invention is applicable to any powder bed-type additive manufacturing device. The present invention is applicable to a powder bed-type additive manufacturing device employing any type of powder or heat source. The present invention is also applicable to a powder sintering method. The powder A (modeling material) may be resin or the like without being limited to metal.

INDUSTRIAL APPLICABILITY

According to some embodiments of the present disclosure, the distribution can be given in a powder supply amount in an axial direction. As a result, powder can be supplied by an appropriate supply amount in accordance with the shape of a modeling surface and surplus powder generation can be suppressed.

REFERENCE SIGNS LIST

1: additive manufacturing device, 3: modeling unit, 10: lifting and lowering device, 31: plate, 33: application mechanism, 34: hopper, 36: modeling tank, 38: collection tank, 39: work table, 39a: upper surface, 39b: hole portion, 40: powder supply device, 41, 41A: roller, 41a: peripheral surface, 41b: groove portion, 43: front wall portion, 43a: wall surface, 46, 46A: drop port, 47: side wall portion, 47a: wall surface, 49: bottom wall portion, 49a: wall surface, A: powder, Aa: deposited powder, L: rotational axis, S: modeling surface.

The invention claimed is:
1. A powder supply device comprising:
a hopper accommodating powder;
a cylindrical roller provided below the hopper and rotatable around a rotational axis; and
a wall surface facing a peripheral surface of the roller and storing the powder in a space between the roller and the wall surface, wherein
the powder stored between the roller and the wall surface is moved in a rotation direction of the roller and dropped by the roller rotating,
a plurality of groove portions extending in an axial direction are formed in the peripheral surface of the roller, at least one of the plurality of groove portions is formed such that a capacity allowing the powder to be accommodated changes in the axial direction; and stuffing material selectively fitted into the at least one of the plurality of grooves that reduces the capacity thereof, wherein the stuffing material is configured to be fixed at any axial position in the at least one of the plurality of grooves.

2. The powder supply device according to claim 1, wherein the capacity in a middle portion in the axial direction is larger than the capacity in an end portion in the axial direction in the at least one groove portion.

3. The powder supply device according to claim 2, wherein the capacity increases from the end portion in the axial direction toward the middle portion in the at least one groove portion.

4. The powder supply device according to claim 3, further comprising a drop port defined between the roller and the wall surface proximate a closest distance therebetween for dropping the powder from a height that is proximate a height of the rotational axis of the roller.

5. The powder supply device according to claim 2, wherein the at least one groove portion has a plurality of different depths formed so as to change groove depth in stages.

6. The powder supply device according to claim 2, further comprising a drop port defined between the roller and the wall surface proximate a closest distance therebetween for dropping the powder from a height that is proximate a height of the rotational axis of the roller.

7. The powder supply device according to claim 1, wherein the at least one groove portion has a plurality of different depths formed so as to change groove depth in stages.

8. The powder supply device according to claim 7, further comprising a drop port defined between the roller and the wall surface proximate a closest distance therebetween for dropping the powder from a height that is proximate a height of the rotational axis of the roller.

9. The powder supply device according to claim 1, further comprising a drop port defined between the roller and the wall surface proximate a closest distance therebetween for dropping the powder from a height that is proximate a height of the rotational axis of the roller.

10. The powder supply device according to claim 9, wherein a gap is provided at the closest distance between the roller and the wall surface that defines the drop port such that the powder drops from the height of the rotational axis of the roller.

11. The powder supply device according to claim 1, wherein a location of the stuffing material within the at least one of the plurality of groove portions is changeable.

12. The powder supply device according to claim 1, wherein the stuffing material is a spacer.

13. The powder supply device according to claim 1, wherein the at least one groove portion has a depth that continuously changes in the axial direction.

14. An additive manufacturing device comprising:
the powder supply device according to claim 1;
a work table provided below the roller and having an upper surface where the powder is placed;
a modeling surface exposed upward beside the work table;
an application mechanism movable onto the modeling surface from the upper surface of the work table; and
a beam emission unit emitting a beam toward powder supplied onto the modeling surface by the application mechanism.

15. An additive manufacturing device comprising:
the powder supply device according to claim 2;
a work table provided below the roller and having an upper surface where the powder is placed;
a modeling surface exposed upward beside the work table;
an application mechanism movable onto the modeling surface from the upper surface of the work table; and
a beam emission unit emitting a beam toward powder supplied onto the modeling surface by the application mechanism.

16. An additive manufacturing device comprising:
the powder supply device according to claim 3;
a work table provided below the roller and having an upper surface where the powder is placed;
a modeling surface exposed upward beside the work table;
an application mechanism movable onto the modeling surface from the upper surface of the work table; and
a beam emission unit emitting a beam toward powder supplied onto the modeling surface by the application mechanism.

17. An additive manufacturing device comprising:
the powder supply device according to claim 7;
a work table provided below the roller and having an upper surface where the powder is placed;
a modeling surface exposed upward beside the work table;
an application mechanism movable onto the modeling surface from the upper surface of the work table; and
a beam emission unit emitting a beam toward powder supplied onto the modeling surface by the application mechanism.

18. An additive manufacturing device comprising:
the powder supply device according to claim 9;
a work table provided below the roller and having an upper surface where the powder is placed;
a modeling surface exposed upward beside the work table;
an application mechanism movable onto the modeling surface from the upper surface of the work table; and
a beam emission unit emitting a beam toward powder supplied onto the modeling surface by the application mechanism.

19. A powder supply device comprising:
a hopper accommodating powder;
a cylindrical roller provided below the hopper and rotatable around a rotational axis; and
a wall surface facing a peripheral surface of the roller and storing the powder in a space between the roller and the wall surface, wherein
the powder stored between the roller and the wall surface is moved in a rotation direction of the roller and dropped by the roller rotating,
a plurality of groove portions extending in an axial direction are formed in the peripheral surface of the roller,
at least one of the plurality of groove portions is formed having an axial extent such that a capacity allowing the powder to be accommodated changes in the axial direction; and
stuffing material selectively fitted into the at least one of the plurality of grooves that reduces the capacity thereof, wherein the stuffing material is selectively fitted into the axial extent of the at least one of the plurality of grooves.

* * * * *